United States Patent [19]

Vandervalk

[11] Patent Number: 5,686,831
[45] Date of Patent: Nov. 11, 1997

[54] GAUGE WITH REVERSIBLE DISPLAY SCREEN

[75] Inventor: Leon C. Vandervalk, Ontario, Canada

[73] Assignee: DeFelsko Corporation, Ogdensburg, N.Y.

[21] Appl. No.: 597,914

[22] Filed: Feb. 7, 1996

[51] Int. Cl.[6] .................................................. G01R 15/00
[52] U.S. Cl. ........................................... 324/115; 324/149
[58] Field of Search .................................. 324/115, 72.5, 324/149, 671, 230

[56] References Cited

U.S. PATENT DOCUMENTS

| | | | |
|---|---|---|---|
| 3,501,697 | 3/1970 | Martin | 324/115 |
| 3,782,324 | 1/1974 | Zembaty | 324/115 |
| 3,893,028 | 7/1975 | Febvre et al. | 324/115 |
| 4,298,837 | 11/1981 | Koslar | 324/72.5 |
| 4,969,647 | 11/1990 | Mical et al. | 463/31 |
| 5,014,046 | 5/1991 | Minami | 345/121 |
| 5,293,132 | 3/1994 | Koch | 324/671 |

*Primary Examiner*—Ernest F. Karlsen
*Attorney, Agent, or Firm*—Burns, Doane, Swecker & Mathis LLP

[57] ABSTRACT

A gauge includes a probe for taking measurements, a microprocessor for processing the measurements taken by the probe; and a screen display for displaying the measurements processed by the microprocessor; wherein the screen display can be selectively operated in a first mode wherein the measurements are displayed on the screen display in a first orientation, and in a second mode wherein the measurements are displayed on the screen display in a second orientation.

1 Claim, 5 Drawing Sheets

FIG. 6

MULTIPLEX SCHEME

| PIN | BP1 | BP2 | BP3 | BP4 | PIN | BP1 | BP2 | BP3 | BP4 |
|---|---|---|---|---|---|---|---|---|---|
| 1 |  |  |  | BP4 | 21 |  |  |  | BP4 |
| 2 | 1O | 1E | 1F | 1X | 22 | BP1 |  |  |  |
| 3 | 1N | 1M | 1K | 1J | 23 | 5X | BC | BB | 8A |
| 4 | 2O | 2E | 2F | 2X | 24 | 8P | BR | BG | 8H |
| 5 | 2N | 2M | 2K | 2J | 25 | 10X |  |  |  |
| 6 | 3O | 3E | 3F | 3X | 26 | OP7 | 7C | 7B | 7A |
| 7 | 3N | 3M | 3K | 3J | 27 | 7P | 7R | 7G | 7H |
| 8 | 4O | 4E | 4F | 4X | 28 | OP6 | 6C | 6B | 6A |
| 9 | 4N | 4M | 4K | 4J | 29 | 6P | 6R | 6G | 6H |
| 10 | 5O | 5E | 5F | 5X | 30 | 11X |  |  |  |
| 11 | 5N | 5M | 5K | 5J | 31 |  | 5C | 5B | 5A |
| 12 | 6O | 6E | 6F | 6X | 32 | 5P | 5N | 5G | 5H |
| 13 | 6N | 6M | 6K | 6J | 33 |  | 4C | 4B | 4A |
| 14 | 7O | 7E | 7F | 7X | 34 | 4P | 4R | 4G | 4H |
| 15 | 7N | 7M | 7K | 7J | 35 | 12X | 3C | 3B | 3A |
| 16 | 8O | 8E | 8F | 8X | 36 | 3P | 3R | 3G | 3H |
| 17 | 8N | 8M | 8K | 8J | 37 | OP2 | 2C | 2B | 2A |
| 18 | BP1 |  |  |  | 38 | 2F | 2R | 2G | 2H |
| 19 |  | BP2 |  |  | 39 | OP1 | 1C | 1B | 1A |
| 20 |  |  | BP3 |  | 40 | 1P | 1R | 1G | 1H |

GAUGE WITH REVERSIBLE DISPLAY SCREEN

BACKGROUND OF THE INVENTION

1. Field of the Invention

The present invention relates to a display screen for a gauge, and more particularly, to a reversible display screen for a coating thickness gauge.

2. Discussion of Related Art

Gauges, such as thickness gauges, have been used for some time. See, e.g., U.S. Pat. Nos. 5,241,280 and 5,293,132.

The above-identified patents disclose coating thickness measurement gauges that are primarily intended to be used while being held in the operator's hand. For example, FIG. 1 of the present application illustrates one of the prior art gauges disclosed in the foregoing patents.

At the base of the gauge is a probe housing 14 that houses a probe for taking thickness measurements. Since the surface to be measured is commonly below the eye-level of the operator, the display screen 15 of the prior art gauge is oriented at an upward angle to facilitate reading by the operator while a measurement is being taken. Such a screen orientation enables easier reading of the screen by the operator when the gauge is being used in a measurement taking mode by a probe at the base of the gauge housing 12.

However, if the gauge body is layed flat on a work or desk surface, as may be the case of a separate probe gauge, the screen would be difficult to read if viewed from the side of the housing 12 from which the probe housing 14 extends because the screen 15 is oriented away from the user. If the operator tried to overcome this problem by viewing the display screen from the side of the housing 12 on which the screen 15 is located, the operator would have great difficulty because the text displayed on the screen would be upside down.

OBJECTS AND SUMMARY

It is an object of the present invention to overcome the disadvantages of the prior art that are discussed above.

It is yet another object of the present invention to provide a gauge that is convenient to use and read in a number of different modes.

Specifically, it is an object of the present invention to provide a gauge having a screen that is conveniently oriented for hand-held operation, and which can also be easily viewed when used in a desk-top mode.

Briefly described, the present invention includes a gauge having a display screen that is oriented in one direction that is convenient to use in a hand-held mode, wherein the orientation of the text displayed on the screen can be reversed, i.e., turned upside-down, so that the text can be easily read when the gauge is used in a desk-top mode.

BRIEF DESCRIPTION OF THE DRAWINGS

FIG. 6 is a table showing the particular multiplexing scheme for a preferred embodiment of the present application.

DETAILED DESCRIPTION OF THE PREFERRED EMBODIMENTS

Figure 1:
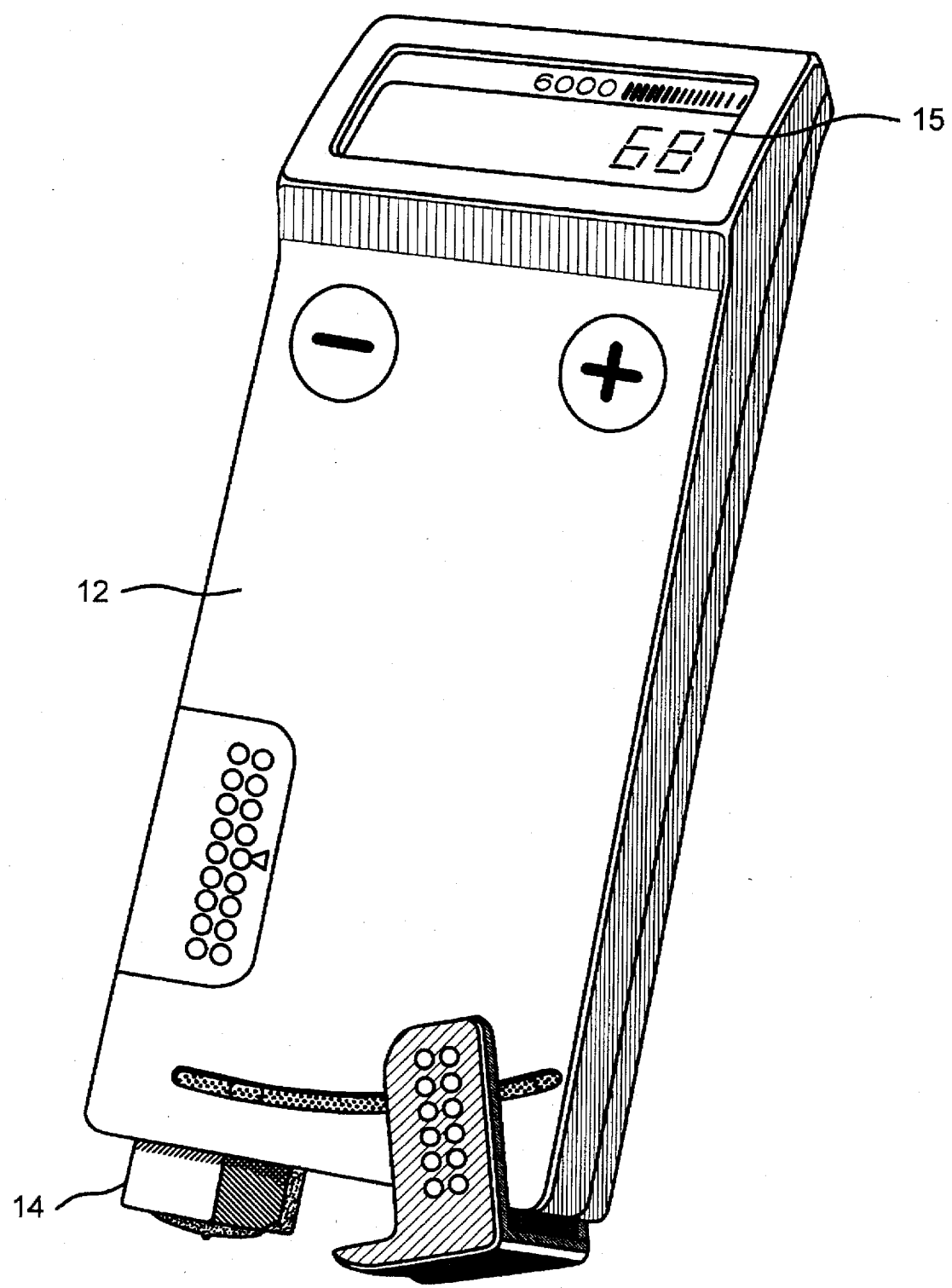
FIG. 1 is a perspective view of a prior art gauge.

FIG. 1 illustrates a prior art coating thickness gauge, such as that disclosed in U.S. Pat. Nos. 5,241,280 and 5,293,132. The subject matter of U.S. Pat. Nos. 5,241,280 and 5,293,132 is incorporated herein by reference.

The disclosed prior art gauges are primarily intended to be used while the gauge housing 12 is being held in the operator's hand. At the base of the gauge housing 12 is a probe housing 14 that encompasses a probe for taking thickness measurements. Since the surface to be measured is commonly below the eye-level of the operator, the display screen 15 of the prior art gauge is oriented at an angle to facilitate reading by the operator while a measurement is being taken. Such a screen orientation enables easier reading of the screen by the operator when the gauge is being used in a measurement taking mode and the measurement is taken by a probe at the base of the gauge housing 12.

However, there may be situations when the gauge may be used while it is laying flat on a desk or work surface, e.g., if an external probe is used with the gauge, or if data previously stored in a memory of the gauge is being read out. If the gauge is used while laying flat on a work or desk surface, the orientation of the screen would render reading of the displayed text difficult, particularly if viewed from the side of the housing 12 from which the probe housing 14 extends.

If the operator tried to overcome this problem by viewing the display screen from the side of the housing 12 on which the screen 15 is located, the operator would again have great difficulty reading the display because the text displayed on the screen 15 would be upside down.

The present invention overcomes this disadvantage of the prior art by providing means for using the display screen in two different modes. In a first mode, the text is displayed on the screen so that the text can be easily read when viewing the gauge from above, such as when the gauge is being used in a hand-held mode. In the second mode, the orientation of the text displayed on the screen is reversed so that the text can be easily read when the gauge is laying flat on a desk or work surface.

Figure 2:
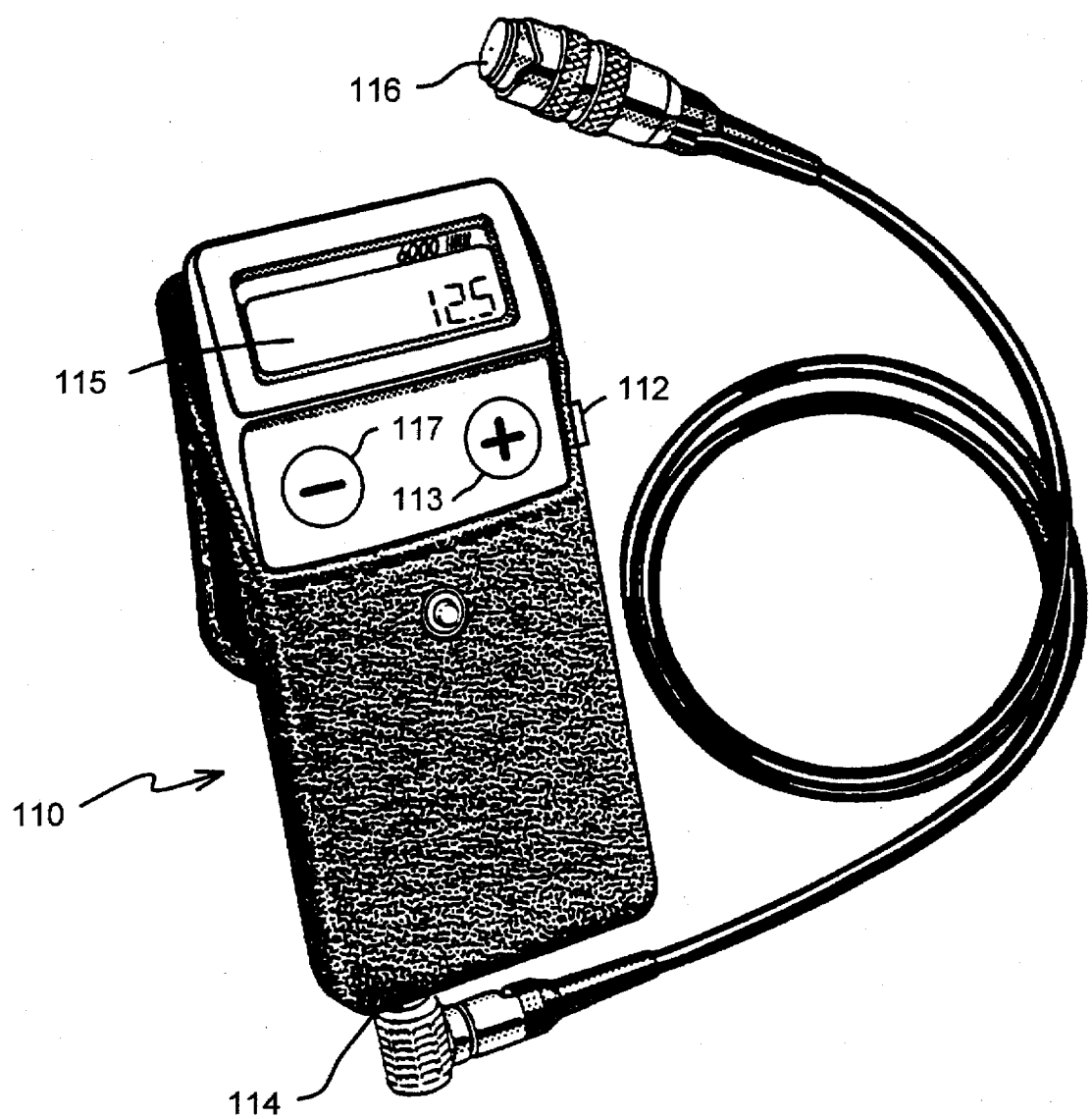
FIG. 2 is a view of a gauge according to the present invention, wherein the screen display is oriented for hand-held use.

Specifically, FIG. 2 illustrates a gauge 110 according to the present invention. The gauge 110 is preferably a coating thickness gauge that operates substantially in accordance with the teachings of U.S. Pat. Nos. 5,241,280 and 5,293,132, except that the gauge probe is attached via a wire and is not fixed within the gauge housing. However, the principles of the present invention could be applied to any number of hand-held instruments that include a screen display for reading out data.

The gauge 110 includes a probe port 114 at a lower (first) end thereof which enables a probe 116 to be connected to the gauge. A display screen 115 is provided at an opposite (second) end of the gauge 110 for reading out measurements or other data. To facilitate reading the screen display 115 during certain operations, the screen display 115 is set at an angle α with respect to a predominant portion of the gauge housing 111. See FIG. 3.

Switches 112, 113, and 117 are also provided on the gauge 110 for controlling the operation thereof. A fourth switch (not shown) may be integral with the probe 116 and is activated when the probe 116 is depressed.

In one mode of operation of an exemplary embodiment, the gauge is powered on by depressing the probe 116 to activate the fourth switch. After an initialization test is performed, the material class previously used by the gauge is displayed on the screen display 115. The material class identifies the type of material that forms the substrate on which the coating to be measured is formed. Examples of such classes are steel and aluminum. Switches 113 and 117 may be used for selecting material classes and/or zeroing the gauge 110.

When the third switch 112 is in a first position, the text on the screen display 115 is oriented in the manner illustrated in FIG. 2. However, for various reasons, a user may wish to set the gauge 110 flat on a desk top or work surface. For example, the user may wish to read out data previously stored in the gauge 110, or the gauge 110 may be used with the remote probe 116. If the text on the screen display 115 were oriented in the manner illustrated in FIG. 2, the text would be difficult to read during such an operation because of the angle α at which the screen display 115 is set.

Figure 3:
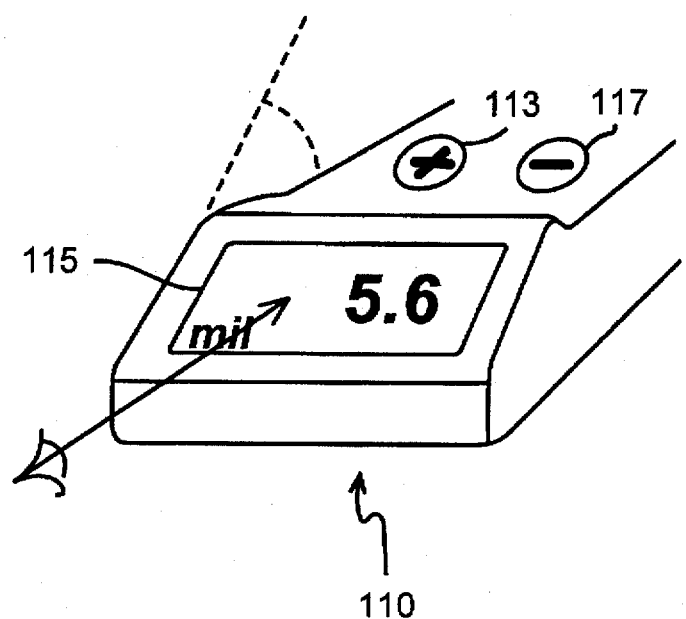
FIG. 3 is a view of the gauge of FIG. 2, wherein the screen display is oriented for desk-top use.

Accordingly, for use in the desk top mode, the third switch 112 may be moved to a second position, which causes the text in the screen display 115 to be reversed, as illustrated in FIG. 3. Alternative embodiments may provide other means for switching the screen display from one mode to another. For example, a unique sequence of actuating switches 113 and 117 may be programmed to cause a change in the mode of the screen display 115.

In one embodiment, the gauge 110 automatically selects an appropriate screen display depending on the mode in which the gauge 110 is being operated. For example, if the gauge 110 is being used to take measurements with an internal probe, the orientation illustrated in FIG. 2 will be automatically set by the gauge 110. However, if the gauge 110 is being used with an external probe, or in a data retrieval mode, the gauge will automatically set the screen display orientation illustrated in FIG. 3.

Figure 4:
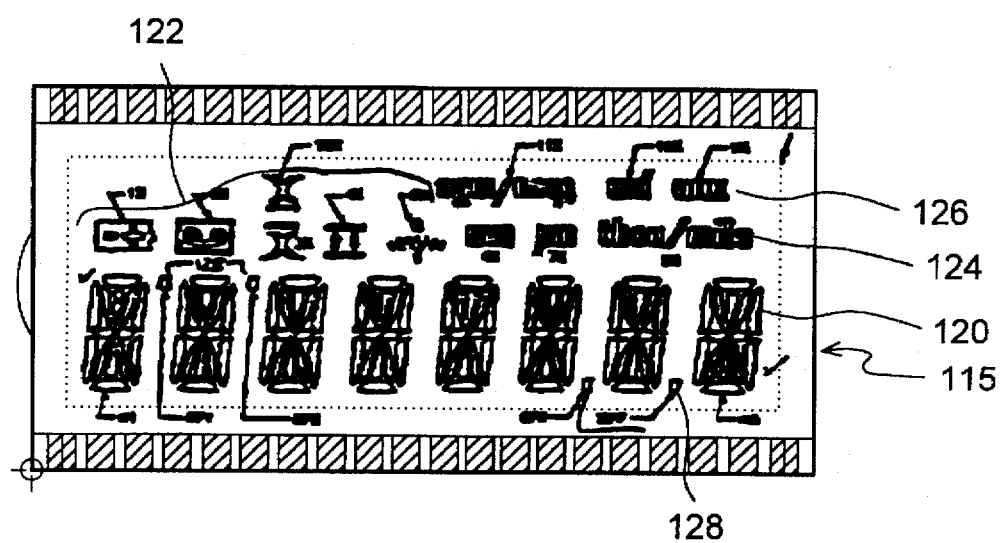
FIG. 4 is a detailed view of a screen display for use with a preferred embodiment of the present invention.

FIG. 4 illustrates a preferred embodiment of the screen display 115 prior to its assembly within the gauge. The illustrated embodiment includes 40 pins. However, other screens may be used. The screen display 115 includes eight separate alpha/numerical elements 120, together with several miscellaneous indicators 122. The screen display 115 also includes matching sets of unit identifiers 124, 126. The first set of unit identifiers 124 is oriented so that it can be read when the screen display 115 is in the first mode, and the second set is reversed with respect to the first set so that it can be used when the screen display 115 is in the second mode.

Two sets 128 of decimal points (".") are also provided so that the appropriate set can be used, depending upon the mode of operation of the screen display 115.

Figure 5:
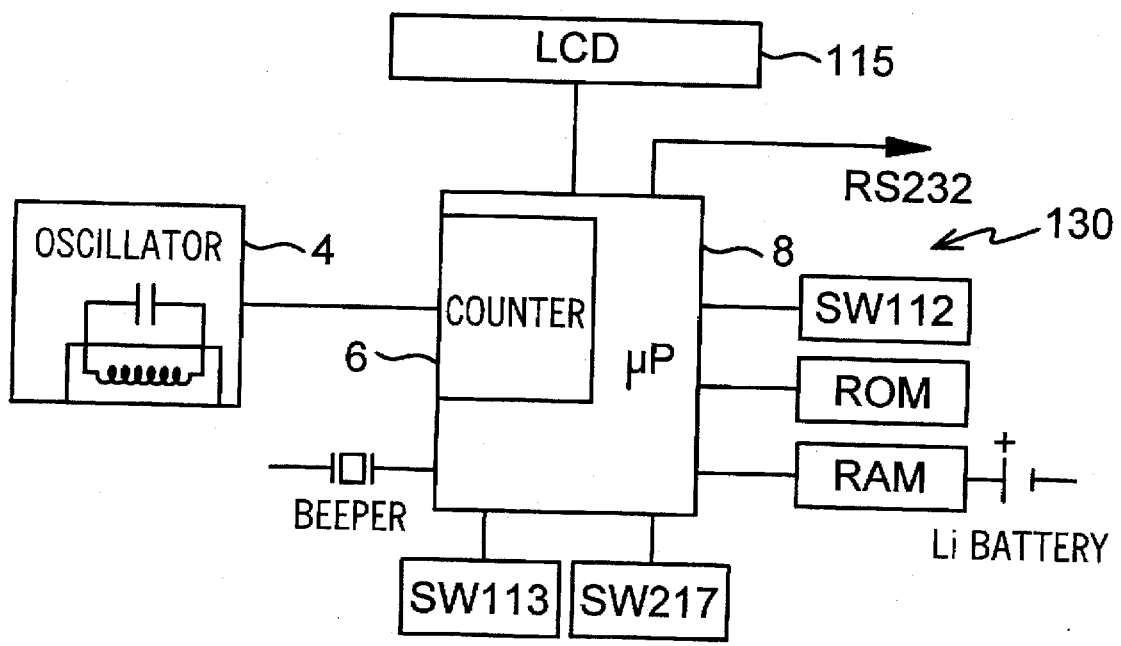
FIG. 5 is a block diagram of a circuit for use with a preferred embodiment of the present invention.

In FIG. 5, a diagram of an exemplary circuit 130 for use with the gauge 110 of the present invention is illustrated. As seen in FIG. 3, the gauge 110 includes a microprocessor unit 8 that is operatively connected with the screen display 115.

An LC oscillator 4 functions as the probe of the gauge 110, and is also connected to the microprocessor unit 8. Although the LC oscillator 4 may be of any suitable type known to those of skill in the art, in a preferred embodiment, the LC oscillator may include an inductor that is a simple air-core solenoid-type coil. In other words, the coil has a core made of nonmagnetic and nonmetallic material.

The impedance of the coil varies with its proximity to an electrically conductive substrate. This results in a corresponding variation in the oscillation frequency of the LC oscillator 4. This frequency is determined by a counter 6, associated with the microprocessor unit 8.

The ROM and RAM may be used to hold data relating to a plurality of substrates or other operational aspects of the gauge 110. The beeper can be used to provide audible signals to the operator indicating that certain functions have been completed, and the RS232 port can be used to connect the gauge 110 to other input or display devices.

FIG. 6 is a table illustrating the particular multiplexing scheme for the display 115 of a preferred embodiment of the present invention. The table cross-references the pins on the display with the backplanes to identify which elements will be illuminated.

The specific manner in which the switch 117 causes the microprocessor unit 8 to reverse the text displayed on screen 115 is not critical to the present invention. Any number of means for causing the reversal are well known to those of ordinary skill in the art, and the details thereof are thus omitted from this description.

It will be appreciated to those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method of using a gauge having a screen display for displaying measurements, said screen display arranged at a first end of a gauge housing and said screen display being oriented at an angle with respect to the gauge housing so that the screen display is tilted toward the first end of the gauge housing so as to facilitate reading the screen display when taking measurements at below eye-level, comprising the steps of:

placing said gauge housing flat on a horizontal work surface;

arranging the gauge housing such that the first end of the display screen is closest to an operator of the gauge; and reversing an orientation of information displayed on the display screen so that the information can be read by the operator from the first end of the gauge housing.

\* \* \* \* \*